United States Patent
Goerke

(12) 
(10) Patent No.: US 6,201,967 B1
(45) Date of Patent: *Mar. 13, 2001

(54) COMMUNICATIONS APPARATUS AND METHOD

(75) Inventor: Thomas Goerke, Middlesex (GB)

(73) Assignee: ICO Services LTD, London (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/926,072

(22) Filed: Sep. 9, 1997

(30) Foreign Application Priority Data

Sep. 9, 1996 (GB) .................................. 9618737

(51) Int. Cl.[7] .................................................. H04Q 7/20
(52) U.S. Cl. .......................... 455/435; 455/12.1; 455/428
(58) Field of Search ................................ 455/12.1, 13.1, 455/427–428, 430, 435, 443, 448

(56) References Cited

U.S. PATENT DOCUMENTS

| | | |
|---|---|---|
| 4,189,675 | 2/1980 | Reilly et al. . |
| 5,329,574 | 7/1994 | Nielson et al. . |
| 5,343,512 * | 8/1994 | Wang et al. ...................... 455/428 X |
| 5,526,404 * | 6/1996 | Wiedeman et al. ................... 455/430 |
| 5,732,359 * | 3/1998 | Baranowsky, II et al. .......... 455/552 |
| 5,815,809 * | 9/1998 | Ward et al. ........................... 455/428 |
| 5,845,206 * | 12/1998 | Castiel et al. ........................ 455/13.4 |
| 5,862,482 * | 1/1999 | Beesley ................................. 455/434 |
| 5,890,679 * | 4/1999 | Chethik .............................. 244/158 R |
| 5,943,621 * | 8/1999 | Ho et al. .............................. 455/456 |
| 6,041,234 * | 3/2000 | Oksanen et al. ..................... 455/434 |

FOREIGN PATENT DOCUMENTS

| | | |
|---|---|---|
| 0 528 522 A2 | 2/1993 | (EP) . |
| 0562374 | 9/1993 | (EP) . |
| 0568778 | 11/1993 | (EP) . |
| 0 655 871 A1 | 5/1995 | (EP) . |

(List continued on next page.)

OTHER PUBLICATIONS

"The Iridium (TM) System personal Communications Anytime, Anyplace", J.E. Hatlelid et al., Proceedings of the Third International Mobile Satellite Conference IMC 93, Jun. 16–18, 1993, pp. 285–290.

"The Globalstar Mobile Satellite System for Worldwide Personal Communications", R.A. Weideman et al., pp. 291–296, Proceedings of the Third International Mobile Satellite Conference IMC 93, Jun. 16–18, 1993, pp. 285–290.

(List continued on next page.)

Primary Examiner—William G. Trost
(74) Attorney, Agent, or Firm—McDermott, Will & Emery

(57) ABSTRACT

A mobile satellite communications system having at least one mobile terminal (2), at least one ground station (6), at least one relay satellite (4) interconnecting said user terminal (2) and said ground station (6), and a management store (48) associated with said ground station (6), in which the user terminal (2) is configured to initiate registration signalling with said store (48). The user terminal (2) initiates registration signalling when reception conditions relating to a downlink channel relayed via said satellite (4) become unsatisfactory over a given time greater than a predetermined minimum value and then return to a satisfactory condition. Specifically, signals received in a given channel are monitored in relation to predetermined criteria, and the duration of periods when the monitored signals do not meet the criteria are timed. Signals for updating the location of the user terminal registered in the management store, are transmitted when said monitored signals in said channel again meet said criteria, only if the timed duration for which the monitored signals do not meet the criteria, is not less than a predetermined time (T2).

27 Claims, 12 Drawing Sheets

FOREIGN PATENT DOCUMENTS

| | | |
|---|---|---|
| 0 662 758 A2 | 7/1995 | (EP) . |
| 2 295 296 | 5/1996 | (GB) . |
| 2295296 | 5/1996 | (GB) . |
| 2296164 | 6/1996 | (GB) . |
| WO 96/16488 | 5/1996 | (WO) . |

OTHER PUBLICATIONS

"Security Aspects and the Implementation in the GSM–System", Peter C.J. van der Arend, pp. 4a, Digital Cellular Radio Conference (DCRC) Conference Proceedings, Oct. 12–14, 1988, published by Deutche Bundespost, France Telecom and Fernuniversitate.

"Study on Networking Issues of Medium Earth Orbit Satellite Communications Systems", Araki et al., Proceedings of the Third International Mobile Satellite Conference IMSC 1993 (JPL publication 93–009), pp. 529–534, published by Jet Propulsion Laboratories (1993).

* cited by examiner

| ID # | STATUS | | | ACTIVE NODE | AVAIL ? | HOME |
|---|---|---|---|---|---|---|
| 00001 | LOCAL | | | 6a | Y | 8a |
| | | | | | | |
| | | | | | | |

FIG. 6a

| ID # | STATUS | | | POSITION | SAT. | BEAM | AVAIL ? | HOME |
|---|---|---|---|---|---|---|---|---|
| 00001 | LOCAL | | | 46°, 35° | 4a | 101 | Y | 8a |
| | | | | | | | | |
| | | | | | | | | |

FIG. 6b

COMMUNICATIONS APPARATUS AND METHOD

FIELD OF THE INVENTION

This invention relates to communications with a mobile user, and in particular to such communications in which the link to the mobile user is via a satellite or satellites.

BACKGROUND ART

U.S. Pat. No. 4,189,675 proposes a satellite communications method and apparatus for communicating with mobile users using a satellite in a predetermined orbit.

EP 0562374 and EP 0568778 are believed to describe the "Iridium" proposed satellite cellular mobile communication system.

An alternative description of the "Iridium" proposals is given in the paper "The Iridium (TM) system personal communications anytime, any place" J. E. Hatlelid and L. Casey, Proceedings of the Third International Mobile Satellite Conference IMC 93, Jun. 16–18 1993, pages 285–290.

An alternative proposed satellite cellular system is described in "The Globalstar Mobile Satellite System for Worldwide Personal Communications", R. A. Weideman, pages 291–296 of the Conference Proceedings mentioned above. Two alternative access network schemes, invented by the author of that paper, and believed to have been proposed for use in the proposed Globalstar system, are described in EP 0536921 and EP 0506255.

GB-A-2295296 and WO-A-96/16488 describe a satellite communications network and in particular the ground segment thereof.

Various terrestrial digital cellular communications systems are known or proposed. Of these, the GSM system is widely known.

In the GSM system, as in other cellular systems, in order to be able to direct incoming calls to a user, it is necessary to be aware of the location of the user (so called "mobility management"). In GSM, this is achieved by the provision of two layers of databases; so called "home location registers" (HLRs), and so called "visiting location registers" (VLRs), and by registration and location updating signalling processes.

Subscriber data on a given user and/or user terminal is stored in a specific HLR for that user. Each mobile switching centre (MSC) associated with a particular geographical area has an associated VLR, in which are temporarily stored details necessary for call management of all users currently thought to be within the area of that MSC.

Initially, a mobile terminal scans the broadcast common control channels (BCCHS) originating from all base stations (BSCs) within its reception, and attempts to register with one. The registration takes the form of an exchange of validation data, as described in "Security aspects and the implementation in the GSM-system", Peter C. J. van der Arend, page 4a, Digital Cellular Radio Conference (DCRC) Conference Proceedings, Oct. 12–14 1988, published by Deutche Bundespost, France Telecom and Fernuniversitate.

Specifically, the mobile terminal identifies itself by transmitting its identity number (IMSI), and the mobile switching centre (MSC) receiving the identification signal from the mobile signals the home location register (HLR) of the mobile and receives authentication data which is stored in the visiting location register (VLR).

The MSC then sends an authentication request signal to the mobile together with a random number, and the mobile uses the random number together with an individual stored subscriber authentication key to calculate a signed response (SRES) which is transmitted back to the MSC.

The MSC then compares the signed response with the security data including a signed response which was supplied by the HLR and, if the two match, the mobile terminal is registered as being within the area of the VLR and MSC. On registration, the identity of the VLR is stored in the HLR for the mobile terminal.

Subsequently, when incoming calls arrive for the mobile terminal, the HLR is accessed to determine the VLR where the mobile is registered and calls are then routed to the MSC associated with that VLR.

Even in idle or "sleep" mode, mobile terminals will continually or periodically scan the broadcast control channels (BCCHs) which they can receive. Each BCCH of a cell carries, amongst other data, a location area identifier (LAI) indicating an individual cell or a group of cells within a certain area. When a new location area indicator is detected (indicating that the mobile terminal has moved into a new area), the mobile terminal transmits a location update request indicating the new LAI.

The exchange of authentication data is repeated, and if the mobile terminal is authenticated the new location area indicator is written into the VLR.

Thus, the VLR continually maintains an indication of which area (and, more specifically, which cell) the mobile terminal is within.

A mobile terminal may also move between the areas of two different VLRs.

Similar issues will arise in relation to satellite communications systems; see, for example, the paper "Study on network issues of medium earth orbit satellite communications systems"; Araki et al, Proceedings of the Third International Mobile Satellite Conference IMSC 1993 (JPL publication 93-009), pages 529–534, published by Jet Propulsion Laboratories (1993). In that paper it is described how either each land earth station may issue a location area identifier signal which is carried by spot beams of satellites within the area, or each spot beam of each satellite may carry a location area identifier.

In the GSM system, there is also a signalling procedure to secure periodic registration from mobile stations, to maintain information on the status of mobile stations.

The mobile terminal performs periodic reregistration or location updating using a timer with a time out over a range of between 6 minutes and 25 hours 30 minutes, the time out being set in accordance with a parameter which is optionally transmitted in the BCCH. The timer value is reset after each signalling activity on the radio path. The current timer value is stored in non-volatile memory when the mobile station powers down. On restoring power, the time starts running again from the value stored in the memory.

The frequency of such registration updates affects the accuracy with which the position of the mobile terminal is known, which is important in setting up calls to or from the user. However, every re-registration or location update uses user terminal and satellite battery power, both of which are potentially scarce resources. Furthermore, the overhead of signalling traffic uses scarce network channel resources without generating revenue.

Accordingly, the present invention provides a method of operating a user terminal to provide mobility management in a communications system in which the user terminal registers data concerning its location in a remote management store, the method including: monitoring signals received from the communications system in relation to predetermined criteria, and upon the monitored signals not meeting the criteria for more than a predetermined time (T2), transmitting from the user terminal, signals for updating the location of the user terminal registered in the management store, when said monitored signals again meet said criteria.

A corresponding terminal is also provided.

Other aspects and preferred embodiments of the invention are as described or claimed hereafter, with advantages which will be apparent from the following.

BRIEF DESCRIPTION OF THE DRAWINGS

Embodiments of the invention will now be described, by way of example only, with reference to the accompanying drawings, in which:

FIG. 6a illustrates the contents of a store forming part of the database station of FIG. 5;

FIG. 6b illustrates the contents of a store forming part of an earth station node of FIG. 3;

GENERAL ASPECTS OF FIRST EMBODIMENT

Figure 1:
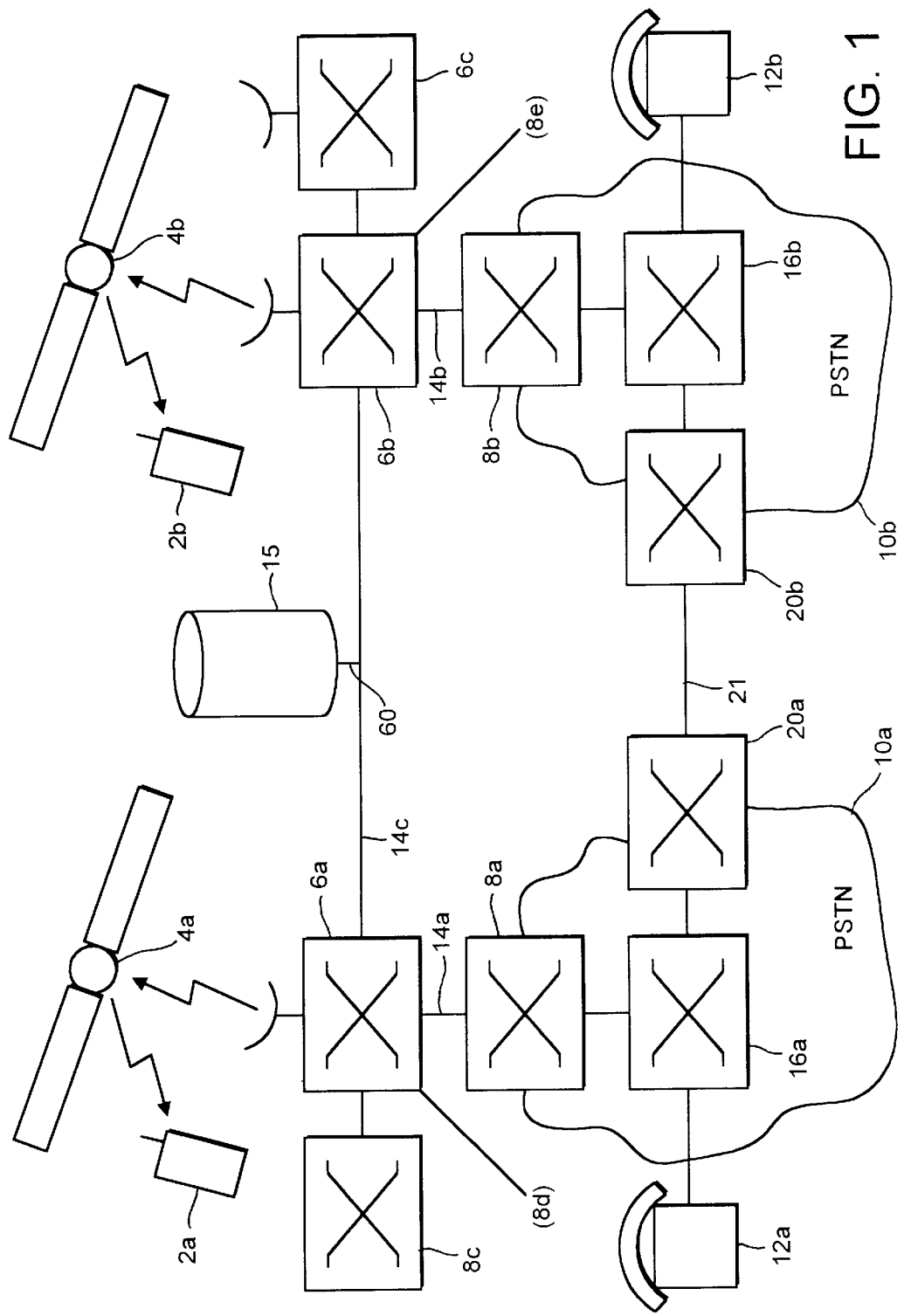
FIG. 1 is a block diagram showing schematically the elements of a first communications system embodying the present invention.

Referring to FIG. 1, a satellite communications network according to this embodiment comprises mobile user terminal equipment 2a,2b; orbiting relay satellites 4a,4b; satellite earth station nodes 6a,6b; satellite system gateway stations 8a,8b; public switched telecommunications networks 10a, 10b; and fixed telecommunications terminal equipment 12a, 12b.

Interconnecting the satellite system gateways 8a,8b with the earth station nodes 6a,6b, and interconnecting the nodes 6a,6b with each other, is a dedicated ground-based network comprising channels 14a,14b,14c. The satellites 4, earth station nodes 6 and lines 14 make up the infrastructure of the satellite communications network, for communication with the mobile terminals 2, and accessible through the gateway stations 8.

A terminal location database station 15 is connected, via a signalling link 60 (e.g. within the channels 14 of the dedicated network) to the gateway station and earth stations 6.

The PSTNs 10a,10b comprise, typically, local exchanges 16a,16b to which the fixed terminal equipment 12a,12b is connected via local loops 18a,18b; and international switching centres 20a,20b connectable one to another via transnational links 21 (for example, satellite links or subsea optical fibre cable links). The PSTNs 10a,10b and fixed terminal equipment 12a,12b (e.g. telephone instruments) are well known and almost universally available today.

Each mobile terminal apparatus is in communication with a satellite 4 via a full duplex channel (in this embodiment) comprising a downlink channel and an uplink channel, for example (in each case) a TDMA time slot on a particular frequency allocated on initiation of a call, as disclosed in UK patent applications GB 2288913 and GB 2293725. The satellites 4 in this embodiment are non geostationary, and thus, periodically, there is handover from one satellite 4 to another.

Mobile terminal 2

Figure 2:
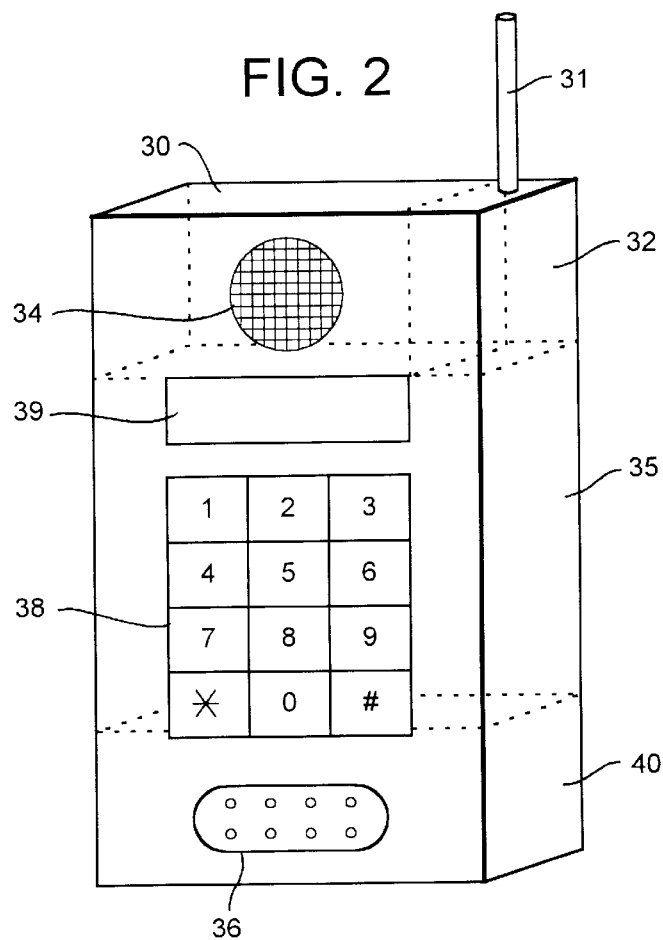
FIG. 2 is a block diagram showing schematically the elements of mobile terminal equipment suitable for use with the present invention.

Referring to FIG. 2, the mobile terminal equipment of FIG. 1 is shown.

One suitable form is a handset, as shown. Details of the handsets 2a,2b etc do not form part of the present invention, but they may comprise handsets similar to those presently available for use with the GSM system, comprising a digital coder/decoder 30, together with conventional microphone 36, loudspeaker 34, battery 40, control processor (e.g. microprocessor) 35 and keypad components 38, and a radio frequency (RF) interface 32 and antenna 31 suitable for satellite communications. Preferably a display 39 (for example a liquid crystal display) is also provided. A 'smart card' reader receiving a smart card storing user information may be present. Further details are disclosed in our earlier UK application GB 9611411.1 filed on May 31, 1996.

The coder/decoder (codec) 30 in this embodiment comprises a low bit rate coder, generating a speech bit stream at around 3.6 kilobits per second, together with a channel coder applying error correcting encoding, to generate an encoded bit stream at a rate of 4.8 kilobits per second. The low bit rate coder may, for example, be a linear predictive coder such as a multipulse predictive coder (MPLPC) a code book excited linear predictive coder (CELP), a residual excited linear predictive coder (RELP) or a multiband excitation coder. Alternatively, it may employ some form of waveform coding such as subband coding.

The error protection encoding applied may employ block codes, BCCH codes, Reed-Solomon codes, turbo codes or convolutional codes. The codec 30 likewise comprises a corresponding channel decoder (e.g. using Viterbi or soft decision coding) and speech decoder.

Earth Station Node 6

The earth station nodes 6 are arranged for communication with the satellites.

Figure 3:
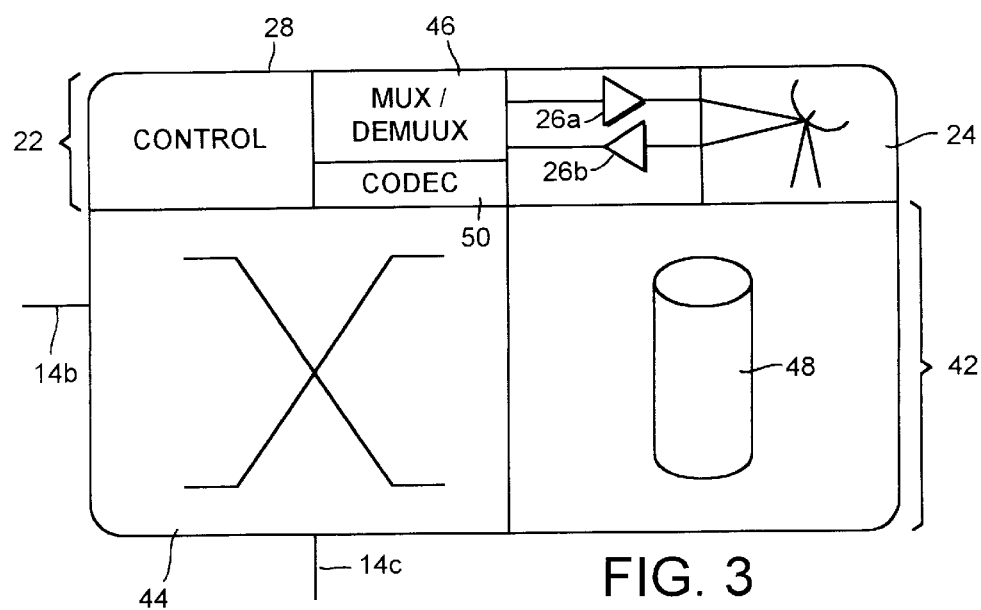
FIG. 3 is a block diagram showing schematically the elements of an Earth station node forming part of the embodiment of FIG. 1.

Each earth station node 6 comprises, as shown in FIG. 3, a conventional satellite earth station 22 consisting of at least one satellite tracking antenna 24 arranged to track at least one moving satellite 4, RF power amplifiers 26a for supplying a signal to the antenna 24, and 26b for receiving a signal from the antenna 24; and a control unit 28 for storing the satellite ephemeris data, controlling the steering of the antenna 24, and effecting any control of the satellite 4 that may be required (by signalling via the antenna 24 to the satellite 4).

The earth station node 6 further comprises a mobile satellite switching centre 42 comprising a network switch 44 connected to the trunk links 14 forming part of the dedicated network. A multiplexer 46 is arranged to receive switched calls from the switch 44 and multiplex them into a composite signal for supply to the amplifier 26 via a low bit-rate voice codec 50. Finally, the earth station node 6 comprises a local store 48 storing details of each mobile terminal equipment 2a within the area served by the satellite 4 with which the node 6 is in communication.

Referring to FIG. 6b, the local store 48 stores, amongst other things, the ID number (e.g. international national mobile subscriber identity or IMSI) of the mobile terminal 2; the status (e.g. local or global) of the terminal; the last known geographical position of the terminal; the satellite 4 through which communication with the mobile terminal is to be attempted and the beam within that satellite; an indication of whether the terminal is or is not available for communication; and an indication of the home gateway 8 of the terminal. Naturally, other data (e.g. authentication data) may also be stored.

Gateway 8

Figure 4:
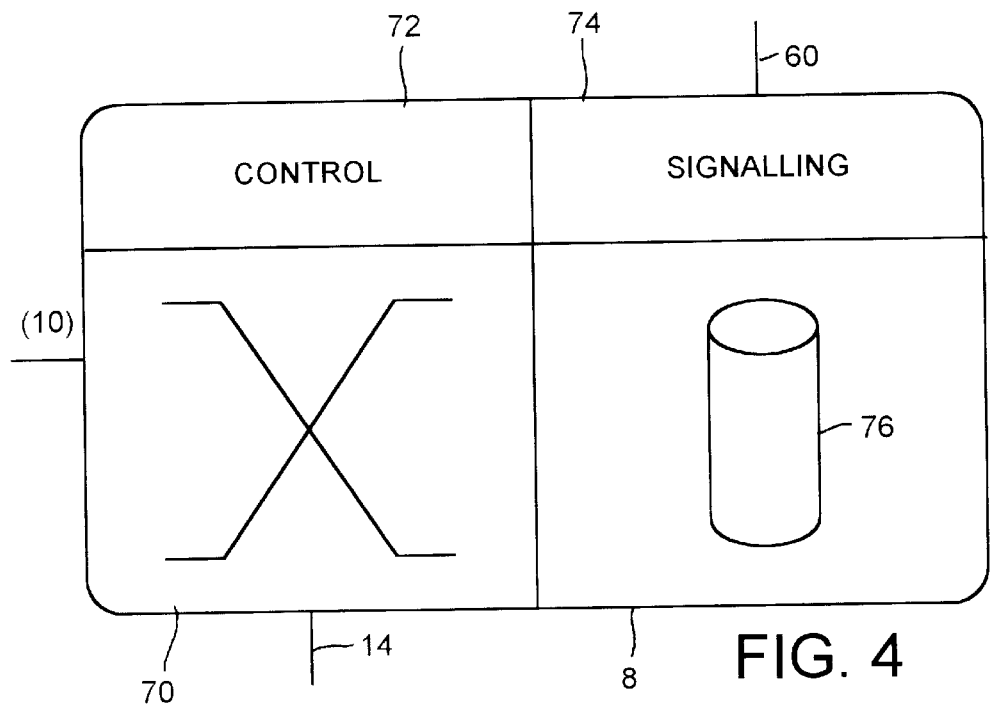
FIG. 4 is a block diagram showing schematically the elements of a gateway station forming part of the embodiment of FIG. 1.

Referring to FIG. 4, the gateway stations 8a,8b comprise, in this embodiment, commercially available mobile switch centres (MSCs) of the type used in digital mobile cellular radio systems such as GSM systems. They could alternatively comprise a part of an international or other exchange forming one of the PSTNs 10a,10b operating under software control to interconnect the networks 10 with the satellite system trunk lines 14.

The gateway stations 8 comprise a switch 70 arranged to interconnect incoming PSTN lines from the PSTN 10 with dedicated service lines 14 connected to one or more Earth station nodes 6, under control of a control unit 72. The control unit 72 is capable of communicating with the data channel 60 connected to the database station 15 via a signalling unit 74, and is arranged to generate data messages in some suitable format (e.g. as packets or ATM cells).

Also provided in the gateway stations 8 is a store 76 storing billing, service and other information relating to those mobile terminals 2 for which the gateway station 8 is the home gateway station. Data is written to the store 76 by the control unit 72 after being received via the signalling unit 74 or switch 70, from the PSTN 10 or the Earth station nodes 6 making up the satellite network.

The satellite system trunk lines 14 comprise, in this embodiment, high quality leased lines meeting acceptable minimum criteria for signal degradation and delay. In this embodiment, all the lines 14 comprise terrestrial links. The trunk lines 14 are preferably dedicated lines, so that the lines 14 form a separate set of physical channels to the networks 10. However, the use of virtual circuits through the networks 10 is not excluded.

Database Station 15

Figure 5:
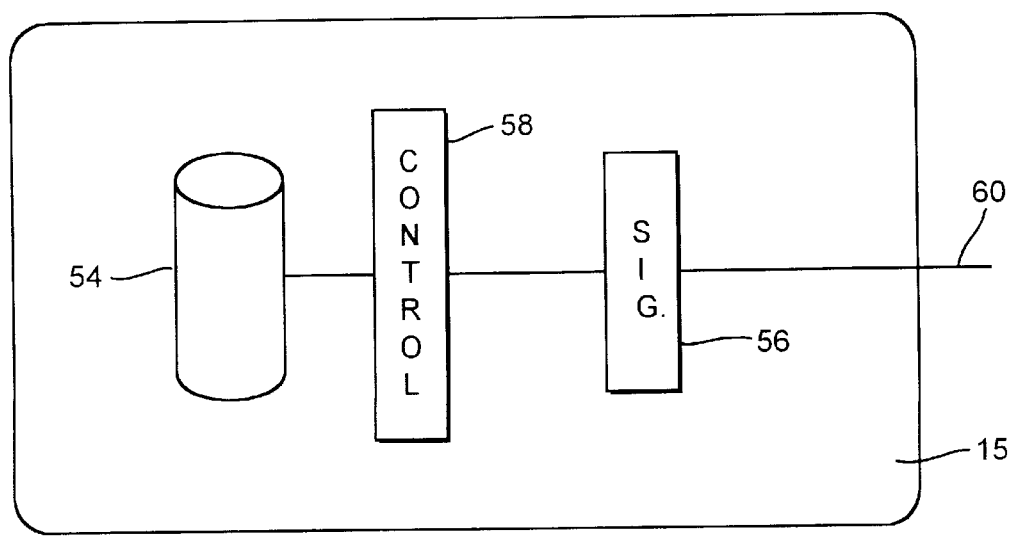
FIG. 5 is a block diagram showing schematically the elements of a database station forming part of the embodiment of FIG. 1.

Referring to FIG. 5 the global database station 15 comprises a digital data store 54, a signalling circuit 56, a processor 58 interconnected with the signalling circuit 56 and the store 54, and a signalling link 60 interconnecting the database station 15 with the gateway stations 8 and Earth stations 6 making up satellite system network, for signalling or data message communications.

The store 54 contains, for every subscriber terminal apparatus 2, a record showing the current status of the terminal 2 (whether it is "local" or "global" as will be disclosed in greater detail below); authentication data unique to each mobile terminal for validating the mobile terminal; the "home" gateway station 8 with which the apparatus is registered (to enable billing and other data to be collected at a single point) and the currently active Earth station node 6 with which the apparatus 2 is in communication via the satellite 4. The contents of the store are indicated in FIG. 6a.

The signalling unit 56 and processor are arranged to receive interrogating data messages, via the signalling circuit 60 (which may be a packet switched connection), from gateways 8 or nodes 6, comprising data identifying one of the mobile terminals 2 (for example, the telephone number of the equipment 2), and the processor 58 is arranged to search the store 54 for the status and active earth station node 6 of the terminal 2 and to transmit these in a reply message via the data line 60.

Satellites 4

Figure 7A:
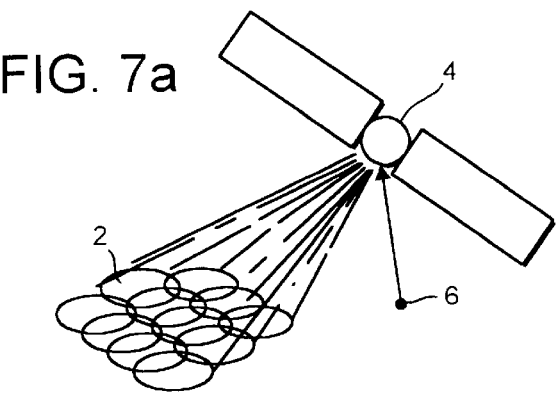
FIG. 7a illustrates schematically the beams produced by a satellite in the embodiment of FIG. 1.

The satellites 4a,4b comprise generally conventional communications satellites, and may be as disclosed in GB 2288913. Each satellite 4 is arranged to generate an array of beams covering a footprint beneath the satellite, each beam including a number of different frequency channels and time slots, as described in GB 2293725 and illustrated in FIG. 7a.

On each beam, the satellite therefore transmits a set of downlink frequencies. The downlink frequencies on adjacent beams are different, so as to permit frequency re-use between beams. Each beam therefore acts somewhat in the manner of a cell of a conventional terrestrial cellular system.

In this embodiment each downlink frequency carries a plurality of time division channels, so that each mobile terminal 2 communicates on a channel comprising a given time slot in a given frequency.

Within each beam there is also provided a common broadcast control channel (equivalent to the broadcast common control channel or BCCH of the GSM system) which occupies at least one of the frequencies for each beam; the frequencies used by the broadcast control channels of the beams are stored within each mobile terminal 2 which is arranged to scan these frequencies repeatedly.

Figure 11:
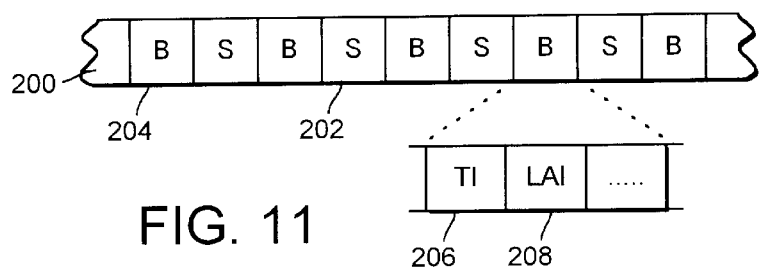
FIG. 11 is a diagram showing schematically the structure of a control channel carried by a satellite beam of FIG. 7a in the embodiments of FIG. 1.

Referring to FIG. 11, each broadcast control channel 200 comprises interleaved synchronisation periods 202 (labelled "S") and broadcast data periods 204 (labelled "B"). Thus, mobile terminals 2 are able to acquire time and frequency synchronisation with the broadcast control channel (and hence the other communications channels) prior to reading the broadcast data 204.

The broadcast data includes, amongst other things, a field 206 containing a time value T1 specifying a re-registration interval (as in the GSM system, specified as a number of 6 minute increments); and a location area identifier field 208 indicating the number of the beam. For example, there may be 61, 121 or 163 beams each carrying a respective number. The number of the satellite may also be indicated within the location area identifier 208.

Figure 7B:
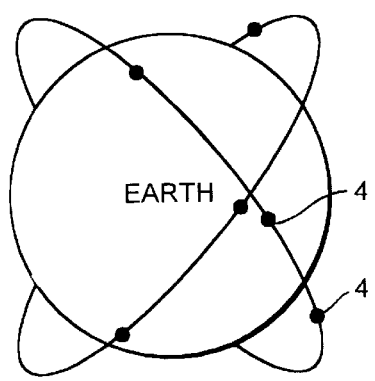
FIG. 7b illustrates schematically the disposition of satellites forming part of FIG. 1 in orbits around the earth.

The satellites 4a are arranged in a constellation in sufficient numbers and suitable orbits to cover a substantial area of the globe (preferably to give global coverage). For example 10 (or more) satellites may be provided in two mutually orthogonal intermediate earth orbits (or more) which may be circular, at an altitude of, for example, 10,500 kilometers (6 hour orbits) as shown in FIG. 7b. Equally, however, larger numbers of lower satellites may be used, as disclosed in EP 0365885, or other publications relating to the Iridium system, for example.

Geographical arrangement

With the number of satellites mentioned below, there may typically be 12 earth station nodes 6, two for each continent. In this manner, each earth station node 6 is connectable to gateways 8 on the continent, whilst having in view one or more satellites 4.

In this embodiment there are a significantly larger number of gateways 8 than of earth station nodes 6; on the order of one per country (i.e. over a hundred in total). For larger countries, several gateways 8 may be provided, at different geographical locations, or (where several network operators are permitted in the country) one per PSTN for different PSTN's. Smaller countries may share gateways 8.

Gateways 8 may also be provided from terrestrial cellular networks.

Registration and Location

A customer mobile terminal apparatus 2 may be registered with one of two distinct statuses; "local" in which the mobile terminal apparatus is permitted only to communicate through one local area, or part of the satellite system network, and "global", which entitles the apparatus to communicate through any part of the satellite system network.

The status of each apparatus 2 (i.e. "local" or "global") is stored in the record held for the apparatus 2 concerned in the stores 54 and 48.

The operation will now be described in greater detail.

The mobile terminal apparatus 2 performs an automatic registration process, of the kind well known in the art of cellular terrestrial communications, on various occasions. As is conventional, the registration process includes the broadcasting of a signal identifying the mobile terminal 2 on a common hailing or signalling frequency (such as the BCCH uplink).

The transmitted signal is picked up by one or more satellites 4. Under normal circumstances, the signal is picked up by multiple satellites 4 and forwarded to the earth station node or nodes 6 with which the satellites 4 are in communication.

The location updating process itself is generally similar to that performed within the GSM system, but for clarity a brief description will be given with reference to FIGS. 8a and 8b.

Figure 8A:
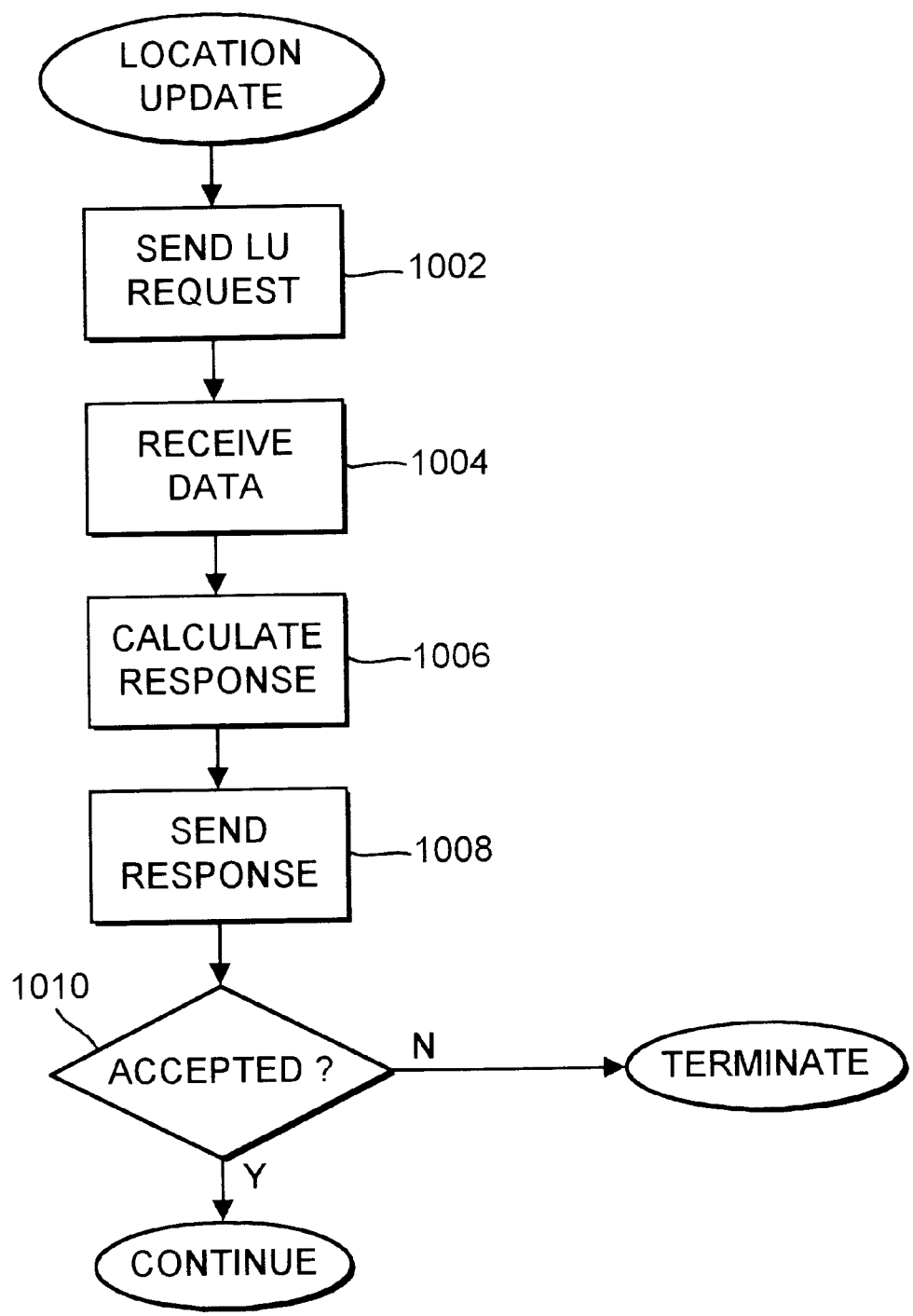
FIG. 8a is a flow diagram illustrating in general terms the steps of a location updating process performed by a user terminal.

Referring to FIG. 8a, in a step 1002 the control processor 35 of the mobile terminal 2 transmits a location update request signal, which is relayed by at least one satellite 4 to at least one earth station 6.

The location update request includes an ID code indicating the mobile terminal (equivalent to the international mobile subscriber identity (IMSI) or temporary mobile subscriber identity (TMSI) used in the GSM system) and further includes the location area identifer (LAI) received by the mobile terminal 2 on the broadcast control channel (BCCH) to which it has synchronised.

Figure 8B:
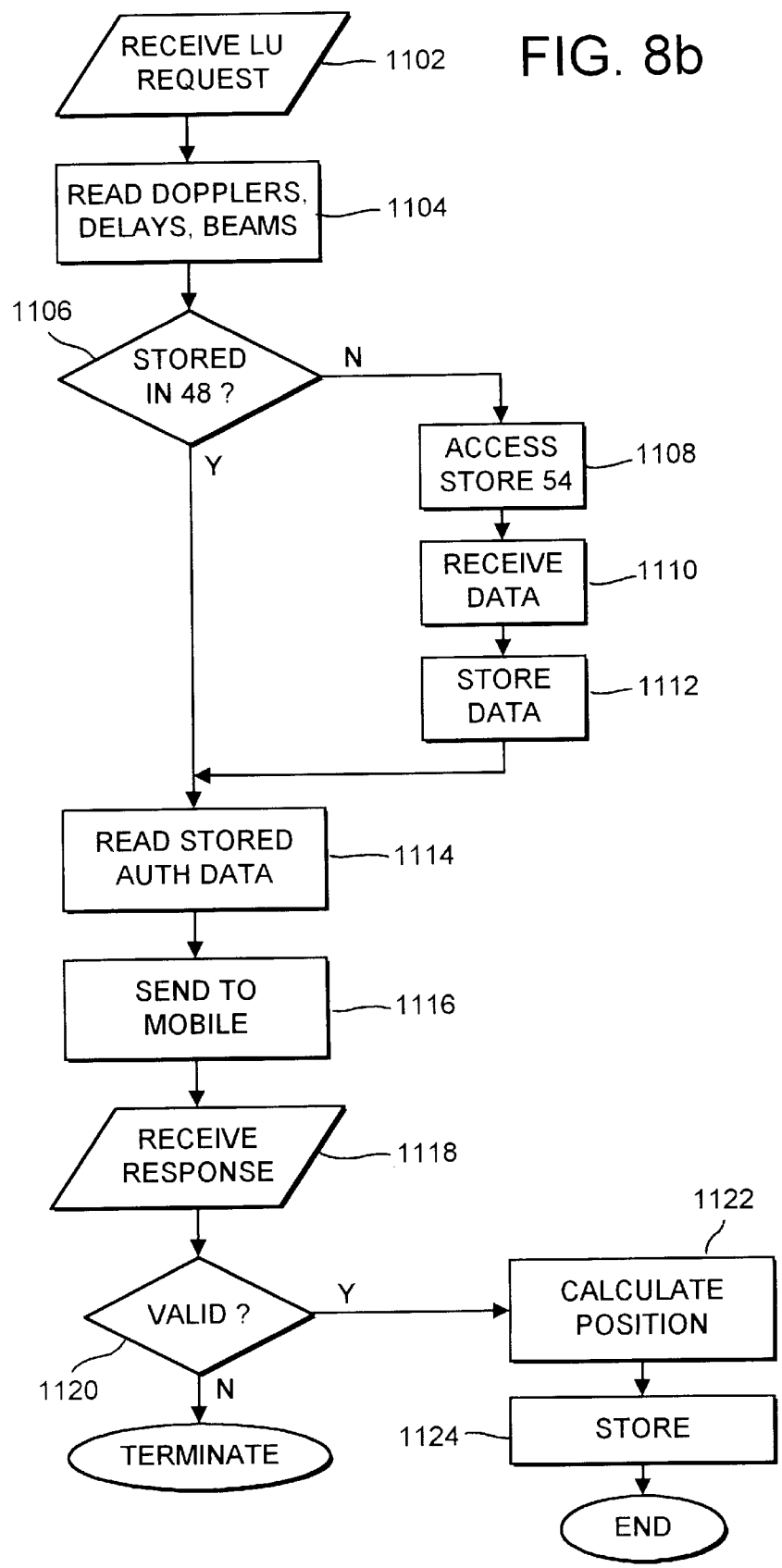
FIG. 8b is a flow diagram showing in general terms the steps performed by the earth station node during the location updating.

Referring to FIG. 8b, the earth station 6 receives, in a step 1102, the location update request and reads the Doppler shift and relative arrival time of the signal via the or each satellite 4 in a step 1104.

In a step 1106, the earth station node 6 determines whether the ID number of the mobile terminal is held within the local store 48.

If details of the mobile terminal are not already stored in the database 48, the earth station node 6 signals to the database station 15 via the signalling link 16 to request details of the mobile terminal.

The database station 15 accesses the database 54 thereof and supplies data concerning the mobile terminal, including in particular authentication data, to the earth station node 6 (step 1108). The earth station node receives the authentication data in step 1110 and stores the data within the database 48 in step 1112.

In step 1114, the earth station node 6 reads the stored authentication data which comprises, conveniently, the same data as is used in GSM; namely a triplet comprising a random number (RAND); an individual terminal key ($K_i$) and a signed response (SRES) created by enciphering the random number using a predetermined algorithm (A3) utilising the individual terminal key $K_i$.

The random number is then transmitted (step 1116) via the satellite 4 to the mobile terminal 2, at which (FIG. 8a, step 1004) it is received.

In step 1006, the mobile terminal 2 (which has stored therein the individual terminal key $K_i$ and the algorithm A3) uses the received random number to calculate the signed response (SRES) which is then transmitted back to the earth station node 6 via the satellite 4 in step 1008.

On receipt thereof (FIG. 8b, step 1118) the earth station node 6 compares the received response with the signed response (SRES) it received from the central database station 15 in step 1120, and if the two do not match then service to the mobile terminal is discontinued, on the assumption that it is not authentic.

If the two do match, then in step 1122, the earth station node calculates the rough terrestrial position of the mobile terminal apparatus 2 using the differential arrival times and/or Doppler shifts in the received signal, and knowledge of which beams of which satellites 4 the signal was received through. The position is then stored in the database 48 in step 1124.

At the mobile terminal 2, it is determined (step 1010) whether the authentication has validated the mobile terminal and, if so, normal operation of the terminal continues. If not, the terminal may, for example, indicate on the display 39 that service has been refused.

The earth station node 6 also determines with which satellite 4 and beam to communicate with the mobile terminal 2, and stores the identities of satellite and beam in the database 48.

Figure 9A:
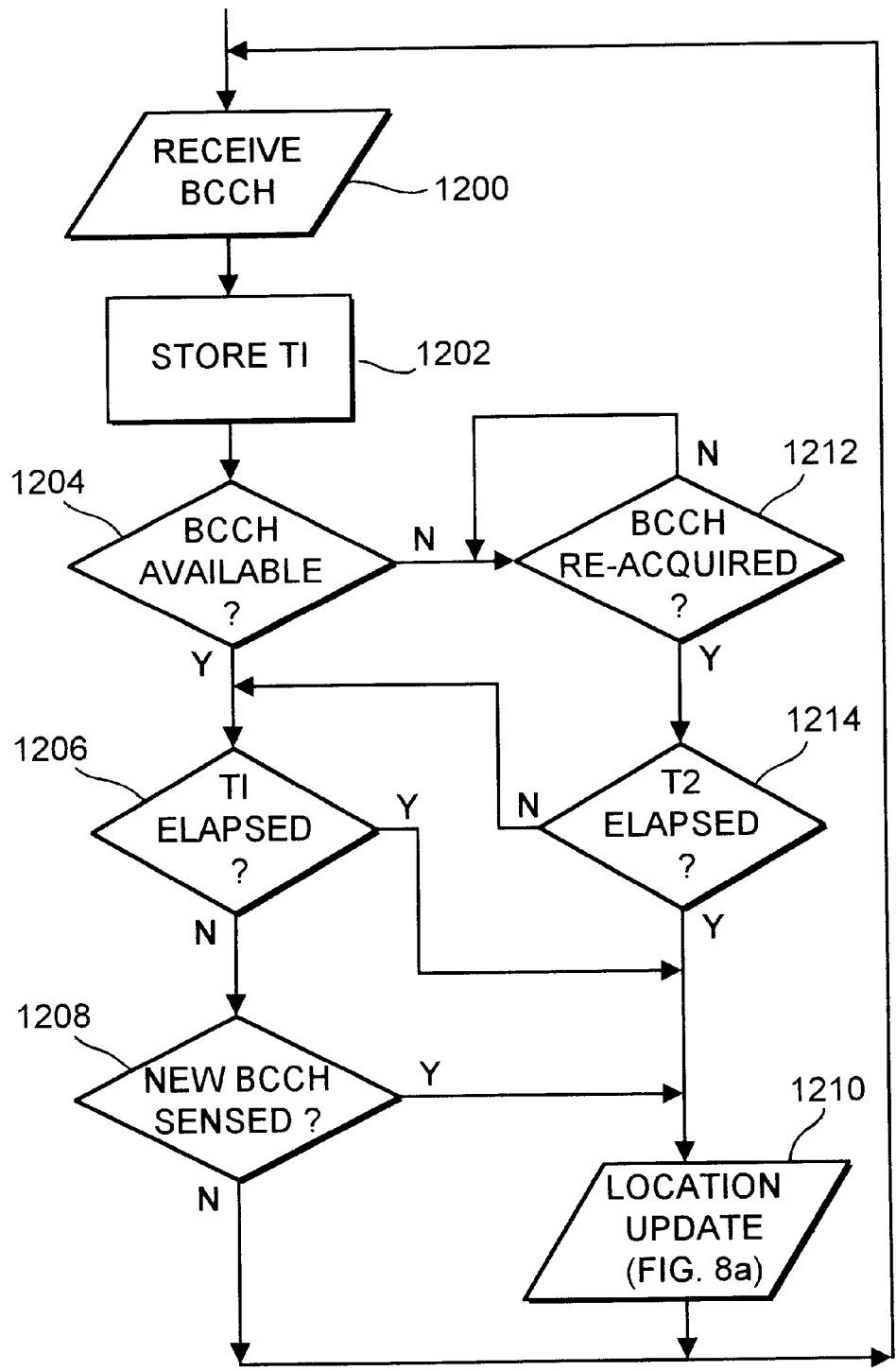
FIG. 9a is a flow diagram showing in general terms the steps performed in determining when to perform a location updating by a mobile terminal.

Referring to FIG. 9, the conditions under which location updating is performed will now be described in greater detail.

Initially, the mobile terminal 2 scans the communication frequency range, and acquires, at some point, a broadcast control channel (BCCH) of a beam of a satellite 4 (step 1200). Within the signal are recurring, repeated transmissions of a location area indicator (LAI) 208 and a location update interval (T1) 206, both substantially in the multiplexed format known from GSM systems (see FIG. 11). Both the LAI and T1 are decoded by the terminal 2 and the update interval T1 is stored (step 1202).

The mobile terminal 2 monitors (step 1204) the received control channel (BCCH) continually. Whilst the BCCH is continually available, on each signalling contact received at the mobile terminal 2 from the earth station node 6 via the satellite 4, the control processor 35 resets a first interval timer which forms part of the processor 35.

The timer continually counts upwards after each such reset.

Periodically (step 1206), the processor 35 examines the count on the first timer and determines whether the period T1 has lapsed.

If not (step 1208), the processor determines from the received location area identifier 208 whether a new BCCH has been received. If so, or if the time T1 has expired, in step 1210 the mobile terminal 2 performs the location update process of FIG. 8a.

If, in step 1204, the BCCH is determined not to be available, the processor 35 resets a second interval timer (again, forming part of the processor 35), which likewise counts continually upwards from each reset.

Figure 10:
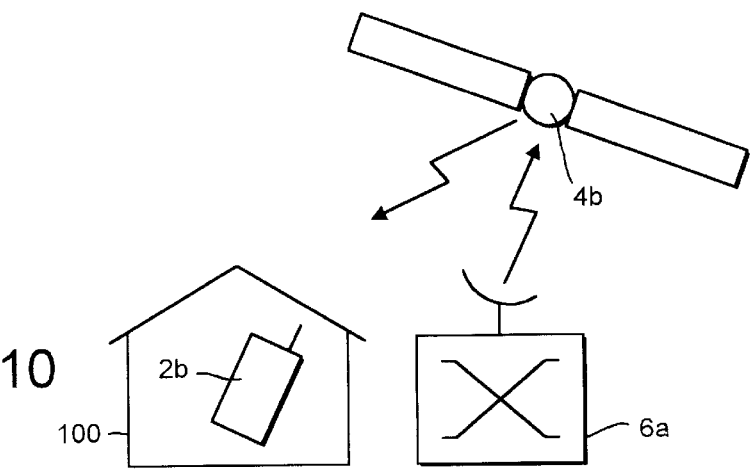
FIG. 10 is a block diagram showing schematically the nature of blockage causing a signal outage in the embodiment of FIG. 1.

Loss of the BCCH may be due to a deep fade on the radio transmission path or to movement into the area of another satellite, or it may be due to the movement of the user into a building 100 as shown in FIG. 10, or to temporary blockage such as a building or other physical obstacle. In such cases, however, the user is very often only temporarily blocked because he or she may move back out of the building or from behind the blockage, or the fade may pass with time.

In step 1212, the mobile terminal 2 continually scans the available downlink frequency bands, and on re-acquisition of a broadcast control channel (BCCH), in step 1214, the control processor 35 reads the second timer and determines whether a predetermined time T2 has elapsed. If not, the processor 35 proceeds to execute steps 1206 as described above.

The predetermined time T2 is typically of the order of an hour (but could vary, for example, between 15 minutes and 4 hours, or even beyond these limits). Usually, the predetermined time T2 will not be below 5 minutes. With a time period of this order, temporary blockages caused by, for example, driving through a tunnel or passing past a tall block of buildings will have no effect on the location updating operation of the mobile terminal 2.

Where, in step 1214, it is determined that the predetermined period T2 has elapsed since the last time at which the mobile terminal 2 was in contact with the earth station node 6, the processor 35 proceeds to step 1210 to perform a location update as described above in relation to FIG. 8a.

Thus, on re-acquiring a control channel signal after having been out of contact for more than the predetermined time T2, the mobile terminal 2 immediately attempts to re-register with the land earth station 6, rather than waiting until the elapsing of the first time out period T1.

Figure 9B:
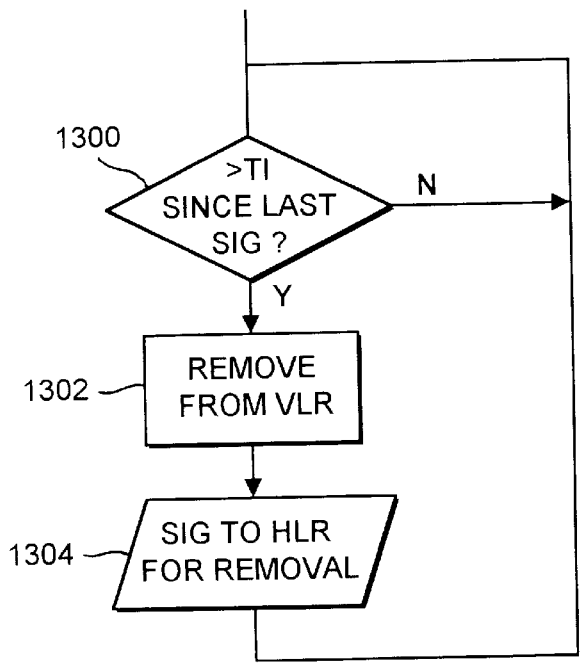
FIG. 9b is a flow diagram showing in general terms the steps performed at the earth station node for periodic de-registration in response to an absence of location updating.

Referring to FIG. 9b, at the earth station node 6, a timer (which is continually reset after each registration signal received from a given mobile station 2) is periodically examined (step 1300) and, when the count of the timer exceeds the predetermined registration period T1, in step 1302 the earth station node 6 removes the record of the mobile terminal from the local database station 48, and (step 1304) signals via the signalling channel 60 to the database station 15 that the mobile terminal is unavailable.

Alternatively, the status of the mobile terminal record may be set to "unavailable" and this may be signalled to the database station 15.

Figure 9C:
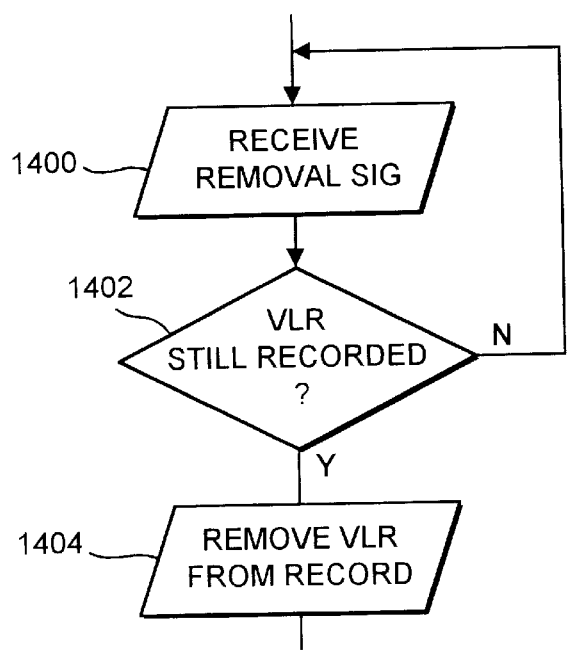
FIG. 9c is a flow diagram showing in general terms the steps performed at the central database station in response to de-registration.

At the database station 15, referring to FIG. 9c, in step 1400 the unavailability signal is received from the earth station node 6 and in step 1402 it is determined whether the earth station node 6 transmitting the unavailability message is registered as the current active earth station node. If so, the status of the user is set at step 1404 to "unavailable". If not, e.g. because the user has registered elsewhere already) the message is ignored.

The time out period T1 is typically of the order of 24 hours, or may be even longer. Recording the mobile terminal as being unavailable, or de-registering the mobile terminal, or deleting the mobile terminal from the local area store records, advantageously reduces the usage of signalling channels and satellite power in fruitless attempts to reach the mobile terminal, when it may be switched off, inactive through loss of power, located in an inaccessible location or physically transported to a different area.

It will thus be seen that the above described embodiment, on the one hand, enables the avoidance of wasted resources by attempts to contact uncontactable mobile terminals. On the other hand, mobile battery power and network resources are also conserved by the avoidance of automatic re-registration after every outage (i.e. every occasion on which contact with the network is lost).

The provision of the predetermined time delay T2 acts as a filter, allowing the terminal to register or location update only after significant outages (likely to correspond to occasions where unsuccessful contacts with the mobile might have been attempted) have occurred.

By registering immediately after a significant outage, however, the mobile is immediately available in the event that stored messages for the mobile are held within the network and can receive these without delay.

Call Set Up and Routing

The processes of routing calls to and from mobile terminal apparatus 2 are generally described in GB-A-2295296 or WO96/16488, both of which are hereby incorporated fully by reference. Briefly, for a local user outside its area, a call placed to the user or from the user is referred to the database station 15 which determines that the user is outside of its area and thereafter does not process the call. For a local user which is inside its area, in the preferred embodiment described in the above referenced British and International application, calls to or from the user are set up over the satellite link, via the active earth station 6, the ground network, and the international public switch telephone network (PSTN) from the nearest gateway 8 to the terrestrial user.

For global users, calls are routed via the satellite and the active earth station, then via the ground network to the gateway station 8 nearest to the terrestrial user.

The dial numbers allocated to mobile users may have "International" prefixes followed by a code corresponding to the satellite service network. Alternatively, they could have a national prefix followed by a regional code assigned to the satellite service.

Calls between one mobile user and another are carried out by directing the signal via a first satellite link down to the active earth station node of the first mobile user, via the ground network to the active earth station node of the second mobile user (which may be, but is not necessarily, the same as that of the first) and then via a second satellite link (which may, but does not need to be via the same satellite) to the second mobile user.

After the active node data stored in the database station 15 has been used to direct an incoming call to the active earth station node 6 for a given destination mobile terminal, the earth station 6 examines the database 48 to determine the most recently recorded position for the mobile terminal and the most recently recorded satellite and beam.

A signal (equivalent to the paging signal of GSM) is sent on the downlink control channel (BCCH) on the identified beam of the identified satellite. If no response is received from the mobile terminal 2, the earth station node 6 examines the position stored in respect of the mobile terminal 2 within the database 48, and determines whether another beam and/or another satellite is also geometrically able to reach the user terminal 6; if so, the paging signal is repeated on the or each such beam and satellite until such contact is made.

The store 54 acts somewhat in the manner of the Home Location Register (HLR) of a GSM terrestrial cellular system, and the store 48 in the manner of the Visiting Location Register (VLR) of GSM; commercially available HLR and/or VLR equipment may therefore be employed for these components, modified as necessary.

Second Embodiment

Figure 12:
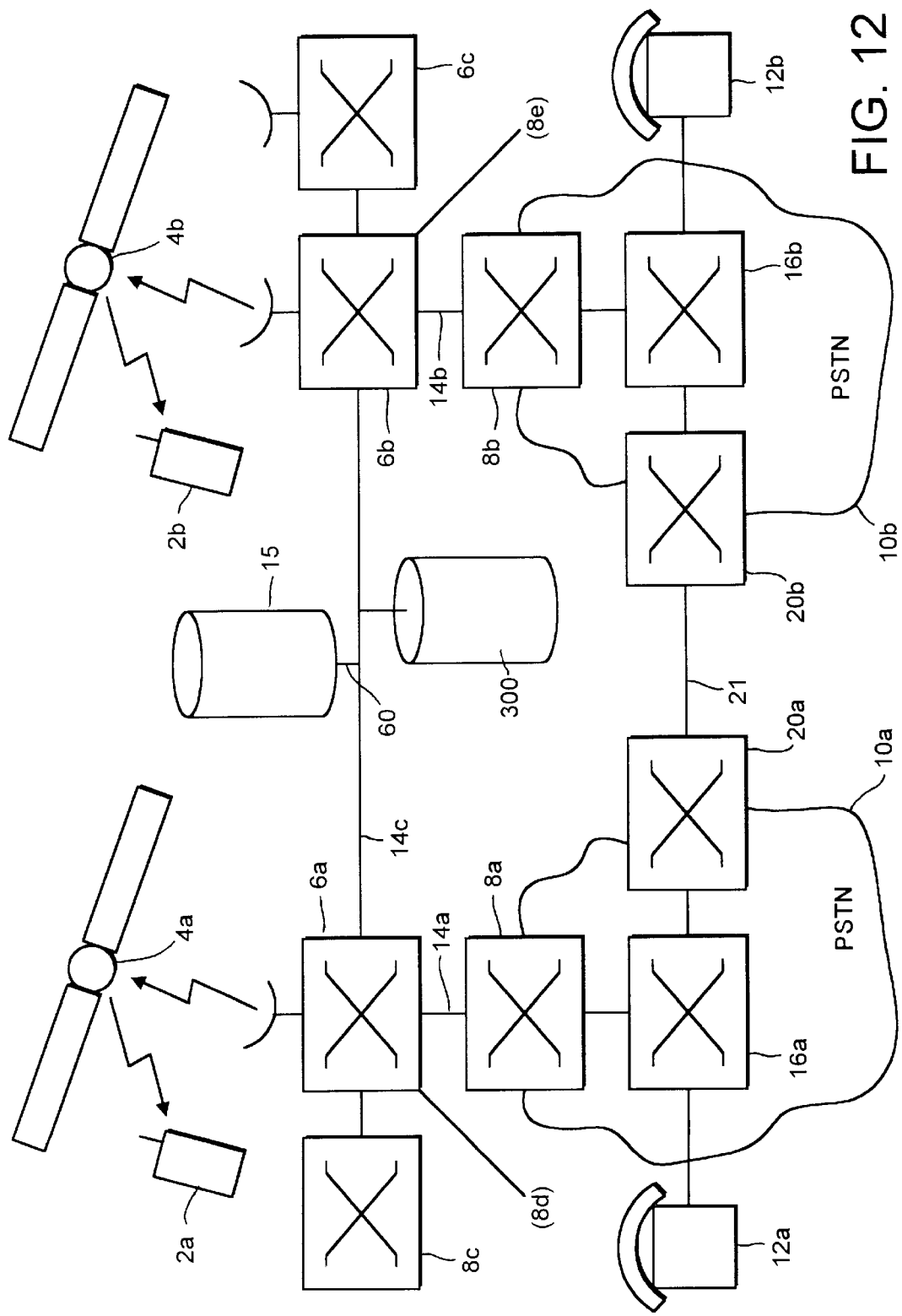
FIG. 12 is a block diagram showing schematically the elements of a second communications system embodying the present invention.

Referring to FIG. 12, in the second embodiment the satellite communications system corresponds to that of the first embodiment, but with the addition of a messaging centre 300.

When an attempt is made to place a call to a user whose status is recorded as unavailable, the database station 15 routes the call (voice, data or fax) to the messaging centre 300, where it is stored, and records a "message waiting" flag.

When the status of the user next changes to "available", the database station 15 sets up a call from the messaging centre 300 to the user so as to forward the message immediately to the user on re-registration thereof with the network.

Third Embodiment

Figure 13:
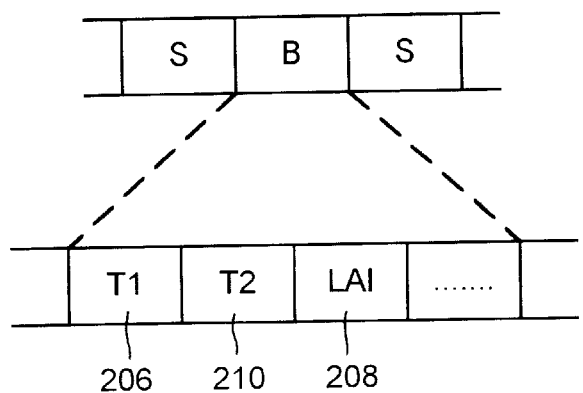
FIG. 13 is a schematic block diagram for explaining operation of a third embodiment of the invention.

In the first embodiment, a fixed time interval T2 is stored at each mobile terminal 2. In this embodiment, however, the broadcast data is 204 is expanded as shown in FIG. 13 to include an additional field 210 containing a value for T2. Each terminal 2 is arranged to read the value of T2 and to store it for subsequent use. Thus, each earth station node 6 is able to control the interval at which reregistration is attempted, and hence to control the frequency at which location updating is performed. Earth station nodes which are carrying heavy signalling traffic may thereby increase the period T2 (and hence reduce the frequency of location updating) to reduce the signalling load.

Fourth Embodiment

Figure 14:
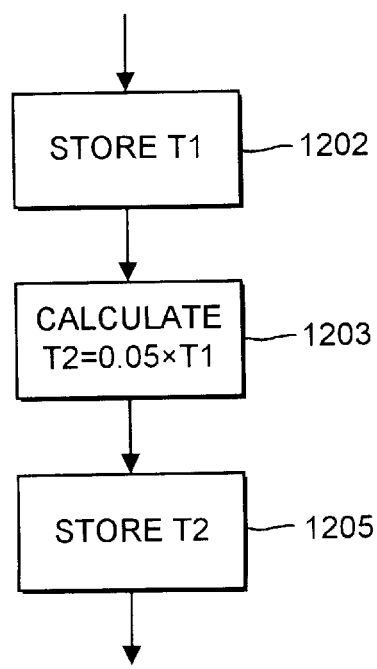
FIG. 14 is a schematic block diagram for explaining operation of a fourth embodiment of the invention.

The third embodiment has the disadvantages that it is not fully compatible with the GSM signalling format, and that additional capacity on the downlink broadcast control channel is required. Accordingly, in this embodiment, as shown as step 1203 in FIG. 14 each mobile terminal is arranged to calculate the time interval T2 as a fraction of the time interval T1 (for example, 4% or 5% of the value of T1). The calculated value of T2 is stored at step 1205. Thus, when under exceptional circumstances earth station nodes 6 wish to reduce the frequency of re-registration, they can alter the value of the interval T1 to make it longer. This requires no modifications to the GSM signalling protocols.

Fifth Embodiment

The above embodiments describe a continuous downlink transmission channel. However, in other mobile communications systems, rather than provide a continuously monitored downlink signal, a downlink control channel may be provided at periodic intervals, so as to allow the mobile terminal 2 to avoid monitoring transmissions for much of the time.

In this case, the mobile terminals 2, the outage duration time can be surmised by monitoring the number of such paging contacts which should have been received but were not thus received.

This embodiment may be combined with the first embodiment in systems where both a common broadcast channel and continuous paging messages are provided; thus, a user terminal may include a location updating condition corresponding to either the elapsing of the aforementioned predetermined time T2, or the absence of a predetermined number of paging signals, or to some weighted combination of the two.

Sixth Embodiment

In the above described embodiments, detection of presence or absence of a broadcast channel is employed. However, it is also possible to take into account the received signal strength of the broadcast channel. Thus, for example, where the broadcast channel is lost and then re-acquired, the interval T2 forming the predetermined criterion for location updating may be calculated by the processor 35 of the mobile terminal 2 in dependence upon the reacquired received signal strength.

Figure 15:
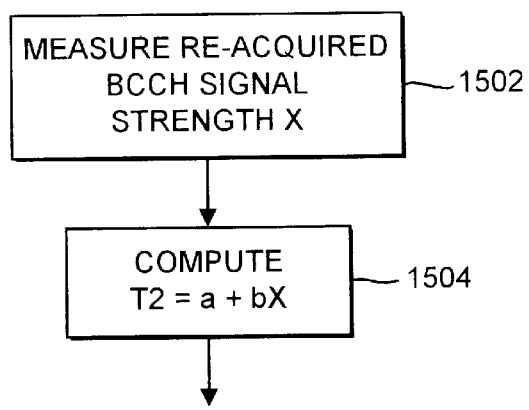
FIG. 15 illustrates a feature of a fifth embodiment of the invention.

For example, as shown in FIG. 15, mobile terminal 2 may be configured so that the processor 35, at step 1502 measures the re-acquired BCCH signal strength X, and at step 1504 computes the interval T2 as a linear function a+bX, where a and b are constants, so that when the broadcast channel is reacquired at a relatively low strength immediate location updating is performed.

This may be useful where it is assumed that a low re-acquisition strength corresponds to a likelihood that the broadcast channel may shortly be lost again.

Seventh Embodiment

Figure 16:
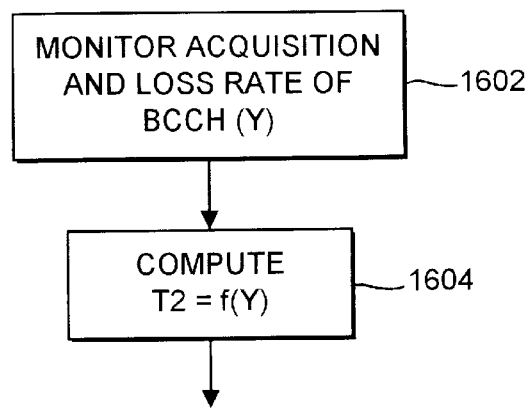
FIG. 16 illustrates a feature of a sixth embodiment of the invention.

In the preceding embodiments, no account is taken of the history of signal loss and acquisition. In this embodiment, however, as shown in FIG. 16, the processor 35 of the mobile terminal 2 at step 1602 monitors the rate Y at which the control channel is acquired and lost over time. The period T2 is computed as a function of the rate Y, i.e. T2=f(Y). If, for example, the control channel has been lost for 10 successive intervals over the previous hour then the time interval T2 may be reduced by a predetermined increment, so as to increase the likelihood of re-registration.

Eighth Embodiment

In the above described embodiments, de-registration is performed after the elapse of a predetermined time interval T1. However, de-registration may instead be performed on the basis of a predetermined criterion based on other factors.

Figure 17:
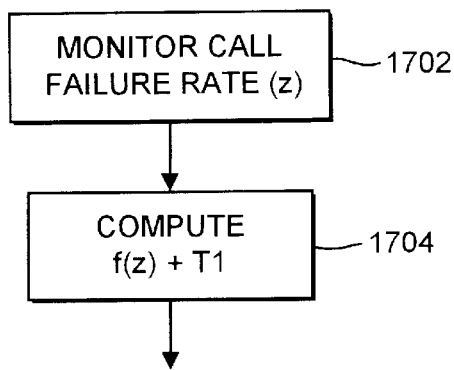
FIG. 17 illustrates in block diagrammatic form, features of an eighth embodiment.

For example, as shown in FIG. 17 the predetermined criterion for de-registration may correspond to a predetermined number of failures Z to set up a call to the mobile terminal 2, monitored at step 1702. It may correspond to a combination (for example a weighted linear sum) of a predetermined time T1 and a predetermined number of call failures, as shown at step 1704.

Naturally, this embodiment and all the other above described embodiments may be combined in any desired sub-combinations.

Other Embodiments

It will be clear from the foregoing that the above described embodiment is merely one way of putting the invention into effect. Many other alternatives will be apparent to the skilled person and are within the scope of the present invention.

For example, the numbers of satellites and satellite orbits indicated are purely exemplary. Smaller numbers of geostationary satellites, or satellites in higher altitude orbits, could be used; or larger numbers of low earth orbit (LEO) satellites could be used. Equally, different numbers of satellites in intermediate orbits cou ld be used.

Although TDMA has been mentioned as a suitable access protocol, the present invention is fully applicable to other access protocols, such as code division multiple access (CDMA) or frequency division multiple access (FDMA) or even single channel per carrier (SCPC).

Equally, whilst the principles of the present invention are envisaged above as being applied to satellite communication systems, the possibility of the extension of the invention to other communications systems (e.g. digital terrestrial cellular systems such as GSM) is not excluded.

Although, for the sake of convenience, the term "mobile" has been used in the foregoing description to denote the terminals 2, it should be understood that this term is not restricted to handheld or hand-portable terminals, but includes, for example, terminals to be mounted on marine vessels or aircraft, or in terrestrial vehicles. Equally, it is possible to practice the invention with some of the terminals 2 being completely immobile.

Instead of providing a single central database station 15 storing details of all terminal equipment 2, similar details could be stored at the home gateway 8 for all terminal equipment to register with that home gateway 8.

In the foregoing, the gateways 8 may in fact be comprised within an ISC or exchange or mobile switching centre (MSC) by providing additional operating control programmes performing the function of the gateway.

In the foregoing, dedicated ground networks lines have been described, and are preferred. However, use of PSTN or PLMN links is not excluded where, for example, leased lines are unavailable or where temporary additional capacity is required to cope with traffic conditions.

It will naturally be clear that the stores within the gateways 8 need not be physically co-located with other components thereof, provided they are connected via a signalling link.

Whilst, in the foregoing, the term "global" is used, and it is preferred that the satellite system should cover all or a substantial part of the globe, the invention extends also to similar systems with more restricted coverage (for example of one or more continents).

It will be understood that the geographical locations of the various components of the invention are not important, and that different parts of the system of the above embodiments may be provided in different national jurisdictions. For the avoidance of doubt, the present invention extends to any part or component of telecommunications apparatus or systems which contributes to the inventive concept.

The foregoing, and all other variants, embodiments, modifications or improvements to the invention are intended to be comprised within the present invention.

What is claimed is:

1. A method of operating a user terminal to provide location updates while the user terminal is registered with a communications network providing a communications service, the user terminal being operable to register data concerning its location in a remote management store, the method including:

monitoring signals received in a given channel transmitted from the communications network in relation to predetermined criteria, timing the duration of periods when the monitored signals do not meet the criteria, and when said monitored signals again meet said criteria and if said timed duration exceeds a predetermined duration, transmitting a location update signal from the user terminal to update the location of the user terminal registered in the management store.

2. A method according to claim 1, wherein the monitoring, includes monitoring the acquisition and loss of reception of the given channel.

3. A method according to claim 1 in which the monitoring comprises monitoring the received signal quality on the given channel.

4. A method according to claim 1 n which the monitoring comprises monitoring the received signal strength of the given channel.

5. A method according to claim 1 in which the monitoring comprises monitoring the rate at which losses of the given channel occur over time.

6. A method according to claim 1, in which the monitoring comprises monitoring the occurrence of a received sequence of paging signals.

7. A method according to claim 1 including periodically transmitting from the user terminal, signals for updating the location of the user terminal as registered in the management store, after a predetermined location update interval.

8. A method according to claim 7 wherein said location update interval is longer than said predetermined duration.

9. A method according to claim 1 including transmitting from the user terminal, signals for updating the location of the user terminal as registered in the management store, in response to signals received from a satellite that indicates a change in the terminal's location.

10. A method according to claim 1, wherein the location of the user terminal is stored in a remote management store based on the signals from the user terminal.

11. A method according to claim 10 further comprising causing the management store to indicate unavailability of the user terminal if no registration of data concerning its location occurs within a given time.

12. A method according to claim 11 in which the communications system is a satellite communications system including one or more satellites.

13. A method according to claim 12 in which the system includes a constellation of satellites in non-geostationary orbits.

14. A method according to claim 12 in which the satellites are in medium earth orbits.

15. A method according to claim 14 in which the orbits are substantially 6 hour orbits.

16. A method according to claim 10 in which there are provided a plurality of said management stores each associated with a corresponding switching node, including storing the stores data relating to more than one said user terminal in a service area for the respective switching node.

17. A method according to claim 16 in which there is provided at least one home store, and the method including storing information relating to the user terminal in the home store regardless of the location of that user terminal.

18. A method according to claim 17 including storing in the home store, information relating to identity of the switching node within the service area of which the user terminal is located, in relation to the or each user terminal.

19. A method according to claim 17 in which the or each management store is arranged to store data defining the approximate position on the earth's surface of a user terminal.

20. A user terminal for providing location updates while registered with a communications network providing a communications service, the user terminal being operable to register data concerning its location in a remote management store, including:

a monitoring device operative to monitor signals received in a given channel transmitted from the communications network in relation to predetermined criteria, a timer for timing the duration of periods when the monitored signals do not meet the criteria, and a transmitter operative to transmit a location update signal to update the location of the user terminal registered in the management store when said monitored signals again meet said criteria and if said timed duration exceeds a predetermined duration.

21. A user terminal according to claim 20 wherein the monitoring device is operative to monitor the acquisition and loss of reception of the given channel.

22. A user terminal according to claim 20 in which the monitoring comprises monitoring the received signal quality on the given channel.

23. A user terminal according to claim 20 wherein the monitoring device is operative to monitor the received signal strength of the given channel.

24. A user terminal according to claim 20 wherein the monitoring device is operative to monitor the rate at which losses of the given channel occur over time.

25. A user terminal according to claim 20 wherein the monitoring device is operative to monitor the occurrence of a received sequence of paging signals.

26. A user terminal according to claim 20 wherein the transmitter is operative to transmit periodically from the user terminal, signals for updating the location of the user terminal as registered in the management store, after a predetermined location update interval.

27. A user terminal according to claim 26 including a timer for defining said location update interval to be longer than said predetermined time.

* * * * *